United States Patent

[11] 3,596,739

| [72] | Inventors | Claude C. Ramsey;<br>William W. Ramsey, both of Tulsa, Okla. |
|---|---|---|
| [21] | Appl. No. | 837,722 |
| [22] | Filed | June 30, 1969 |
| [45] | Patented | Aug. 3, 1971 |
| [73] | Assignee | Ramsey Winch Co.<br>Tulsa, Okla. |

[54] SPEED RESPONSE BRAKE ASSEMBLY
2 Claims, 3 Drawing Figs.

[52] U.S. Cl............................................. 188/105,
188/171, 188/185
[51] Int. Cl........................................................ B60t 13/04,
B60t 8/04
[50] Field of Search............................................ 188/105,
170, 171, 180, 184, 185

[56] References Cited
UNITED STATES PATENTS

| 1,904,089 | 4/1933 | Schwerin...................... | 188/185 |
| 2,285,134 | 6/1942 | Williams....................... | 188/171 X |
| 3,204,737 | 9/1965 | Anner........................... | 188/185 X |
| 3,333,821 | 8/1967 | Pohl et al...................... | 188/185 X |

FOREIGN PATENTS

| 198,207 | 5/1923 | Great Britain................ | 188/105 |

*Primary Examiner*—Duane A. Reger
*Attorney*—Ralph E. Zimmerman

ABSTRACT: An electrical brake-clutch assembly useful in controlling the speed of rotation of a shaft capable of moving in a forward or reverse direction. The speed response brake in combination with the electrically controlled brake becomes effective to overcome the override in an electric motor caused by the excessive speed of the assembly shaft connected to the electric motor.

INVENTORS.
CLAUDE C. RAMSEY
WILLIAM W. RAMSEY

ATTORNEY

SPEED RESPONSE BRAKE ASSEMBLY

This invention relates to an electrical brake assembly with a speed response brake, the operation of the electrical brake being controlled by a solenoid in which the brake is automatically applied when the solenoid is deenergized. The combination of an electrical brake controlled by a solenoid is disclosed in the U.S. patents to Carroll, No. 2,949,949 issued Aug. 23, 1960, and U.S. Pat. No. 3,348,639 issued to Ames, et al. Oct. 24, 1967. Both of these patents disclose the broad concept of an electrical brake per se controlled by a solenoid. The invention I shall disclose is a means to control the speed of a rotating shaft in addition to and used in conjunction with an electrical brake, to prevent override in the electric motor. The speed response brake assembly which I shall describe in detail is useful to prevent damage to the armature in an electric motor due to excessive r.p.m. developed by a rotating shaft connected into the electric motor. The excessive r.p.m. is developed when a load is being lowered from a high to a low position on the end of a cable over a drum, the drum being mounted on the power shaft. During such an operation, the cable wraps around a cable drum (not shown) assembled on the shaft 13, FIG. 1, and builds up increasing reverse speed in the free wheeling of the shaft which is in excess of the speed which can be tolerated by the armature. This excessive speed causes the windings in the armature of the electric motor to burn out, resulting in delays in the use of the equipment. To control this speed, I have invented a speed response brake which, with in the electric brake assembly, is useful in controlling the speed of rotation of the shaft connected to the armature in the electric motor.

In the preferred embodiment of this invention, the centrifugal force developed by the rotating shaft in this assembly causes the speed response brake assembly to engage with the braking surface when the r.p.m. of the shaft is in the range of 4,900 to 5,100. The braking action prevents the armature mounted on the same shaft from rotating at excessive speeds. When the speed drops below 4,900 r.p.m., the speed response brake assembly automatically releases and the shaft returns again to free wheeling.

SUMMARY OF THE INVENTION

The primary object of this invention is to prevent a shaft with a load attached from overriding the armature in an electric motor.

Another object of this invention is to furnish an automatic speed response brake which engages at a predetermined speed to slow down the speed of rotation of a load-carrying power shaft member in combination with an electric motor.

Still another object of this invention is to furnish means which will automatically engage and disengage, thus controlling the speed of rotation of a load carrying power shaft which is in combination with an electric motor.

Figure 1:
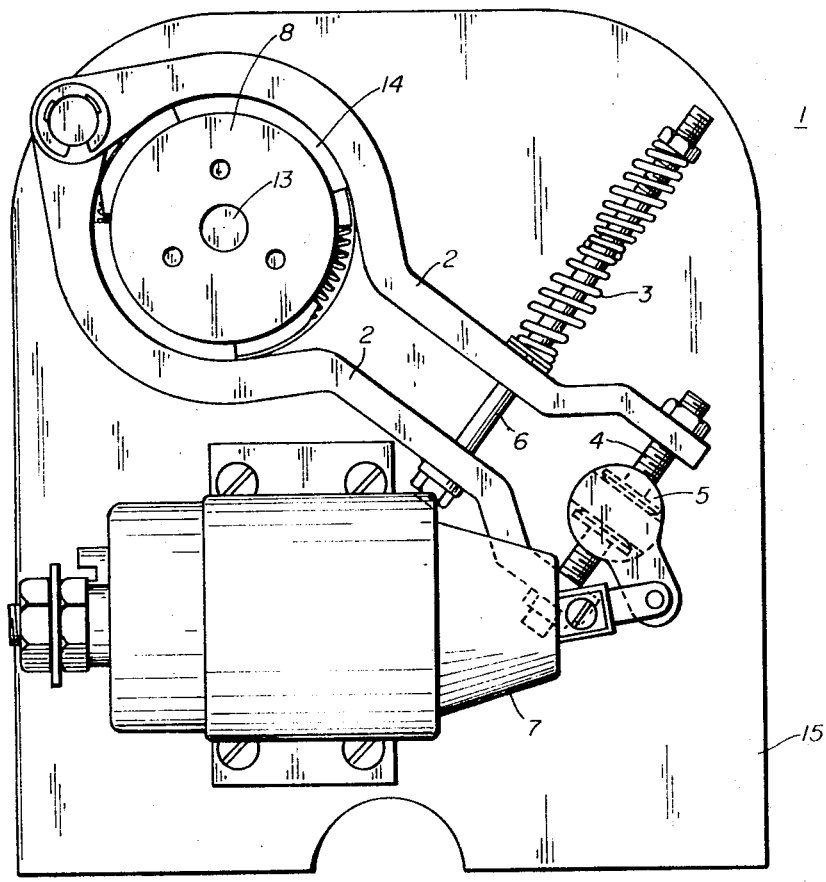
FIG. 1 illustrates a front view of the speed response brake assembly showing structure of the electric brake in assembly with the automatic speed response brake.

Reference is made to FIG. 1 which illustrates the electric brake assembly which includes a pair of brake arms 2 with brake shoes 14 attached, the brake arms 2 being pivotally connected and mounted on the base 15. The brake arms 2 are actuated by a cam 5 which is connected by linkage to a solenoid 7. The preloaded spring 3 which is mounted on a threaded shaft 6 affords opportunity for adjusting preloading the spring 3 on the threaded shaft. The threaded shaft 6 with the preloaded spring 3 mounted thereupon is extended through the lower flat sections of the brake arms 2. The loading of the spring 3 is adjusted to create the desired pressure on the brake arms 2. The brake arms 2 keep the brakeshoes in contact with the drum whenever the solenoid 7 is in a closed position. The solenoid 7 returns to a closed position when the power to the unit is off. When the power is applied to the solenoid, the cam is actuated in a quarter-circular direction against the pair of adjustable flat headed screws mounted in the lower extremity of the brake arms 2. The movement of the cam opens and closes the brake arms 2.

As was previously stated, the movement of linkage which connects the solenoid 7 to the cam 5 changes the position of the cam 5 in relationship to the adjustable flat headed screws 4 in the brake arms 2 from a flat surface to a round surface. Since the brake arms 2 are pivotally mounted on the other end, the changing of the cam position will cause the brake arms to open and release the brakeshoes from the drum 8.

The movement of the cam 5 opens the pivoted brake arms 2 away from drum 8 to allow the rotation of shaft 13. The solenoid 7 through the cam 5 and the linkage works against the preloaded spring 3 to hold the brake arms 2 open. When the solenoid is deenergized, the cam actuated through the linkage will return again with the flat surface of the cam 5 in contact with the flat screw heads. The preloaded spring 3 on the threaded screw then causes the brake arms 2 to move inwardly and apply a braking action on the drum 8. However, when a load is moving downwardly attached to the cable (not shown) winding around a drum (not shown) connected to the shaft 13, the speed of the shaft increases rapidly exceeding a safe rotating speed for the armature in the electric driving motor, causing excessive heat build up. The operation of the electric brake in this assembly is only useful to make a complete stop of the shaft when rotating since the solenoid 7 which controls the electric brake 1 always holds the electric brake in an open position during the forward and reverse movement of the power shaft 13, FIG. 1. To control the speed of the shaft and yet permit the cable on the drum (not shown) to unwind, when the load is moving downwardly at an increasing speed requires in addition to the electric brake a means to control the speed of the shaft 13 when the r.p.m. exceeds 4,900. I have discovered that the addition of the disclosed speed response brake adds the necessary means to control the speed of the power shaft 13, FIG. 1, upon which both the cable drum (not shown) and the armature of the electric motor are mounted.

Figure 2:
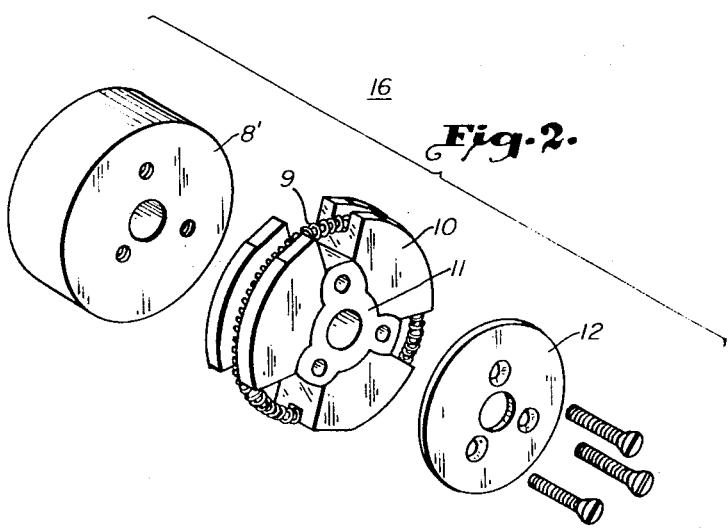
FIG. 2 illustrates a fragmented view showing the structure of the speed response brake itself.

Reference is made to FIG. 2 which portrays a fragmented view of the speed response brake consisting of a spring 9, a set of friction shoes 10, a body 11, mounted on the power shaft, a plate 12 and a drum 8'. The complete assembly as shown is mounted into a bored opening which is fitted with a wear ring 17 cast into the mounting plate 15, FIG. 3. Drum 8' which is attached to the clutch 16, FIG. 3, with screws and pinned into shaft 13. Drum 8', FIG. 1, is the braking surface upon which the brakeshoes 14, FIG. 1, engage to stop the movement of the shaft 13, FIG. 1. Attached to this drum and mounted on the same shaft 13 is the speed response brake means which, as I have previously stated, is a means of controlling the r.p.m. of the shaft.

Figure 3:
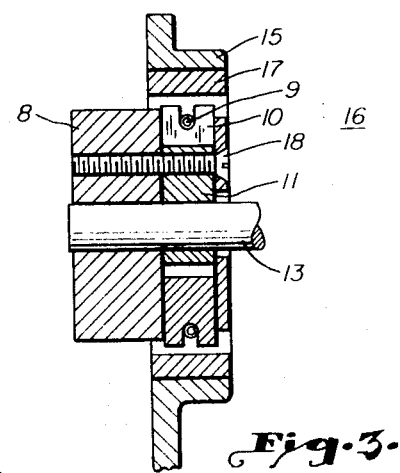
FIG. 3 illustrates a sectional view of the speed response brake assembly showing the brake clutch which is in combination with the electric brake FIG. 1.

Reference is made to FIG. 3 which shows a cross-sectional view of the brake 16. This cross-sectional view shows the speed response brake clutch 16 fitted into a circular wear ring 17 which acts as a braking surface for the speed response brake 16. The circular wear ring 17 is cast into an opening in the mounting plate 15, FIG. 3. The friction shoes 10, body 11, plate 12, components of the speed response brake, are shown attached as an assembly to drum 8 by screws 18. Body 11 is attached to shaft 13, FIG. 3 and rotates with shaft 13. Body 11 furnishes nesting means for friction shoes 10, the movement and position of which against the ring 17 is controlled by the amount of centrifugal force developed as shaft 13, FIG. 3 rotates. The amount of tension in the springs 9 also aids in holding the friction shoes in proper position in nesting body 11, and reacts against the centrifugal force of the rotating shaft. As was previously stated, the speed response brake rotates with power shaft 13 and only engages wear ring 17 at a predetermined r.p.m. of the power shaft.

The preferred embodiment of the speed response brake requires a hardened steel wear ring of 60 Rockwell hardness or equivalent, the friction shoes 10 are fabricated from Garlock braking material or any other suitable braking material which can be machined to fit into the brake clutch assembly. The friction shoes 10 are nested in a body 11 and held in position by a spring 9. The specifications of the circular spring are critical only to the extent of controlling the movement of the friction shoes 10 outwardly to engage the fitted wear ring 17 in the mounting plate 15 at the predetermined r.p.m. requirement. The preferred embodiment requires a 0.051 hard wire with a 0.187 outside diameter, the length of the springs 9 being 7 inches each in two sections joined on the ends to form a circular spring which holds the friction shoes 10 nested in the body 11. The body 11, the friction shoes 10 held in position by spring 9 and plate 12 in assembly are joined to drum 8' by a set of screws. The drum 8' is pinned to shaft 13, FIG. 1. The shaft 13 passes through plate 15, FIG. 1 and is connected by a motor adapter to the armature shaft (not shown) of the electric motor.

The electric brake in combination with the speed response brake furnishes the means to control the speed of rotation of the power shaft and the means for stopping a load-carrying power shaft in many applications. A specific example of a load-carrying power shaft is a power shaft in a winch application.

We claim:

1. In an assembly, braking apparatus for a rotatable shaft, an electric brake in combination with a rotatable speed response brake, comprising:
   a. a mounting plate with means through which to pass the said rotatable shaft;
   b. a rotatable cylindrical drum attached to the extremity of the said rotatable shaft,
      1. the said cylindrical drum being attached to the said speed response brake,
      2. the said speed response brake mounted on the said rotatable shaft and fitted into an opening on one side of the said mounting plate, having
         a. a body mounted on the said rotatable shaft,
         b. a set of friction shoes nested in the said body;
         c. a spring positioned around the said friction shoes;
         d. a plate to hold the said friction shoes in place,
   c. a pair of brake arms partially circular in structure with circular brakeshoes attached, the said brake arms being pivotally mounted together with a single-connecting means on the opposite side of the said mounting plate so as to remain in contact with the surface of the said cylindrical drum when in a normally closed position,
      1. the movement of the said brake arms being actuated by linkage from the said brake arms coupled through a cam to a solenoid;
         a. the said cam having alternate flat and round edges positioned between a pair of opposite adjustable screws approximately perpendicular to and mounted in the said flat surface members of the said brake arms.

2. The assembly as claimed in claim 1 where the said partial circular structure of the said pair of brake arms are extended to form approximately parallel flat surface members,
   a. the said approximately parallel flat surface members having a rod with means to adjust the length passing through each of the said flat surface parallel members,
      1. the rod being positioned in such a manner so as to support a tension adjustable spring,
      2. the said tension adjustable spring acting as the means to return the said brake arms to a closed position.